Patented Apr. 5, 1932

1,852,988

UNITED STATES PATENT OFFICE

JOSEF VARGA, OF BUDAPEST, HUNGARY, ASSIGNOR TO DEUTSCHE GOLD- UND SILBER-SCHEIDEANSTALT VORMALS ROESSLER, OF FRANKFORT-ON-THE-MAIN, GERMANY, A CORPORATION OF GERMANY

PROCESS FOR THE DESTRUCTIVE HYDROGENATION OF CARBONACEOUS SUBSTANCES

No Drawing. Application filed October 24, 1928, Serial No. 314,849, and in Germany June 12, 1928.

The invention relates to the treatment of carbonaceous substances of various kinds with hydrogen, or gases containing hydrogen or yielding hydrogen under the reaction conditions, in which the initial substances are converted into valuable, mostly liquid, products by hydrogenation, reduction, or decomposition, or, if desired, by a plurality of these operations. The following are examples of initial substances suitable for the destructive hydrogenation: fossil fuels such as mineral coal, brown coal, wood, peat, lignite etc; the products or constituents of the products obtained from these substances by distillation, extraction, hydrogenation, cracking, splitting up (decomposition) and other kinds of treatment, such as the products from the carbonization of wood, tar-oils, brown coal-tar-oils, for example such as contain paraffins and unsaturated compounds and the like; and, again, the further transformation products obtained, for example by hydrogenation, cracking etc. Other initial substances are, for example, mineral oils and bitumens of various kinds such, for example, as petroleums, shale oils, asphalt, mineral wax and the like, as well as products obtained therefrom.

The "hydrogenizing" treatment of such initial substances has hitherto mostly been carried out by subjecting them to the action of hydrogen, or gaseous mixtures containing hydrogen, under a high pressure and at a high temperature in the absence or presence of catalysts. Sulfur and sulfur compounds have hitherto functioned in this connection as troublesome catalyst poisons and, consequently, sulfur-containing starting materials, e. g. tar oils, crude naphthalene etc., have had to be subjected before being hydrogenated to a troublesome and costly desulfurizing process. Again, labor has been expended in the direction of discovering "sulfur-proof" catalysts which eliminate the detrimental effects of sulfur and sulfur compounds.

Exhaustive experiments have now led to the surprising discovery that by using an excess of hydrogen, suitable sulfur compounds, when used in correct quantities, have a very favorable catalytic effect upon the reaction which can be still further improved by co-operation with other catalysts. Catalysts in the sense of the present invention have been found in sulfuretted hydrogen and sulfur-containing substances which, under the given reaction conditions, are adapted to form sulfuretted hydrogen. Substances yielding sulfuretted hydrogen that come into consideration under the given working conditions are, inter alia, readily decomposable sulfur compounds, for example, alkali or alkaline earth sulfides; also similarly readily decomposable compounds containing the sulfur in organic combination, for example thiophene; and, further, carbon bisulfide and, above all, sulfur itself.

If the treatment of the initial materials, for example, substances of the kind mentioned above, with hydrogen be carried out in the presence of suitable quantities of sulfuretted hydrogen or suitable quantities of substances producing sulfuretted hydrogen and in the simultaneous presence of, for example, molybdenum or its compounds, advantages are obtained which are unobtainable with the known catalysts, for example molybdenum compounds, including molybdenum sulfide by themselves. In particular, it is possible to prepare in this way technically pure hydrocarbon mixtures which can be used directly, i. e. without refining, as motor fuels, lubricating oils, solvents etc. Such products that are obtainable by the present process owe their valuable properties to the fact that they consist almost entirely of saturated aliphatic, aromatic and hydro-aromatic hydrocarbons whilst they are practically free from compounds containing oxygen, sulfur or nitrogen and contain only harmless quantities of unsaturated hydrocarbons.

It is important for the success of the process that the sulfur during the reaction should be available in the form of sulfuretted hydrogen. It has, for example, been found that the combination of sulfur with heavy metals, for example with metals of the iron group in the form of their sulfides, further the complete combination of sulfur with molybdenum itself in the form of molybdenum sulfide, prevents the realization of the desired catalytic result. Thus if, for example, molybdic acid and elementary sulfur are used as catalysts, it is necessary, for obtaining a favorable action, to use more sulfur than is necessary for the formation of the compound $MoS_2$ or $MoS_3$. If the operation is carried out in new reaction vessels, for example of iron, the walls of which are still capable of combining with appreciable quantities of sulfur, this behaviour must be taken into account by increasing the quantity of sulfur or sulfur compounds added.

The quantities of sulfuretted hydrogen favorable to the reaction are dependent upon the nature of the material to be treated. Generally, these quantities range between 1 and 6 parts of sulfuretted hydrogen to 100 parts of the initial material. The most suitable proportions within these limits must be specially selected for each initial substance. For example, in the case of beechwood tar-oil the presence of 4 per cent of sulfuretted hydrogen during the reaction proved to be advantageous, whilst in the case of brown coal producer tar-oil the desired effect was obtained in the presence of 1.5 per cent of sulfuretted hydrogen. Less favorable results were obtained on going below or exceeding these quantities.

When treating sulfur-containing initial materials, for example tar oils, the organically combined sulfur, which is adapted to produce sulfuretted hydrogen under the conditions stated, must be taken into account. Thus in these cases the added quantiy of, for example, sulfur must be such that the total quantity of the sulfuretted hydrogen available during the reaction falls within the limits within which the effects favorable to the reaction are exerted. In particular cases, namely when treating initial materials which are in themselves sufficiently rich in sulfur compounds capable of producing sulfuretted hydrogen, special addition of sulfuretted hydrogen or bodies producing sulfuretted hydrogen may be dispensed with. In treating initial substances which are very rich in sulfur, the optimum proportion of sulfur can be obtained, for example, by mixing with a raw material poor in sulfur.

It has been found that as a general rule in treating products derived from wood, lignite, brown coal and the like the degree of carbonization of the original raw material is a criterion for determining the amount of sulfuretted hydrogen that is necessary; thus products derived from wood require the greatest quantity of sulfuretted hydrogen whilst the quantity required for products derived from fossil fuels decreases with the age of the fuel.

Further experiments have shown that the catalytic effects of sulfuretted hydrogen or compounds producing sulfuretted hydrogen in conjunction with, for example, molybdenum compounds—e. g. molybdic acid, molybdates,—can be further heightened by the co-operation of auxiliary catalysts (activators). Such auxiliary catalysts are, for example, boric acid and compounds of boric acid, e. g. borates. The efficacy of these auxiliary catalysts is especially evident when used in the treatment of paraffins and unsaturated compounds or products derived from these substances, for example, brown coal tar-oils rich in paraffin. Generally, very small quantities of auxiliary catalysts, for example, 0.5 to 1 per cent calculated on the starting material, prove to be sufficient.

The catalysts or auxiliary catalysts can with advantage be introduced on carriers of suitable material.

In carrying out the invention, the initial substance may, for example, in discontinuous working, be heated under pressure with hydrogen or gases containing hydrogen and the catalysts in a suitable apparatus, for example in a stirring or rotating autoclave. The most favorable reaction temperatures generally lie between 250° and 700° C., preferably between 350° and 500° C., and the pressures employed above 50 atmospheres, preferably between 100 and 500 atmospheres. The reaction is generally completed within an hour. The hydrogen or the reducing gaseous mixture must be employed in fairly large excess, for example in such quantities that the hydrogen present amounts to two or three times the quantity used up in the destructive hydrogenation. The most suitable proportions are best determined by experiment. In other respects the conditions, especially the proportions, should be so chosen that the highest pressure attained during the reaction is not less than 100 atmospheres. During the heating up process the internal pressure rises to a maximum value (maximum pressure), which as a rule is attained when the maximum temperature is reached. Hereafter, the temperature remaining constant, the pressure again falls. The maximum pressure has been found to be characteristic for the course of the reaction. When the reaction has been completed the gases and vapours are allowed to escape and, if desired, are condensed in various fractions.

In continuous working the initial substances, for example, in the form of gases, vapours, liquids or atomized liquid or solid substances, are passed together with hydrogen or gases containing hydrogen through an autoclave filled with the solid catalyst and heated to the reaction temperature. Generally a working pressure of 100–250 atmospheres is necessary in this case. Care should also be taken in this case that the proportions of starting material, hydrogen and sulfuretted hydrogen, as well as the velocity of the stream of the whole gas and vapour mixture through the reaction chamber, remain constant during the reaction or that the content of sulfuretted hydrogen is kept during the operation within the limits favorable to the reaction.

The following examples serve to illustrate how the invention may be carried into effect:

1. 300 gms. of a breechwood tar-oil fraction boiling between 180° and 237° C., of which 60 per cent is soluble in a 14 per cent caustic soda solution, are heated in a rotating autoclave with a capacity of 4 litres together with 12 gms.—i. e. 4 per cent—of sulfur (or the corresponding quantity of carbon bisulfide) and 6 gms.—i. e. 2 per cent—of molybdic acid at 450° C. for about one hour with hydrogen, the initial pressure being 125 atmospheres. The highest pressure attained is 250 atmospheres at 375° C., the final pressure 238 atmospheres and the pressure after cooling 58 atmospheres. The product remaining in the autoclave after cooling and escape of the gases consists of 210 gms. of oil and 55 gms. of water which form two layers. The oil has a specific gravity of 0.789 and gives no phenolic reaction with ferric chloride; 0.5 per cent dissolves in 14 per cent alkali solution. The product contains 2.8 per cent of unsaturated compounds. On distillation, 88.2 per cent pass over up to 150° C. and 96.2 per cent up to 200° C. The oil is water clear and does not change even on prolonged standing.

The superiority of the combined catalyst consisting of sulfuretted hydrogen and molybdenum over molybdenum when used as catalyst by itself is apparent from a comparison experiment with 300 gms. of the same oil and 6 gms.—i. e. 2 per cent—of molybdic acid subjected to the same conditions. In this case, after the occurrence of a maximum pressure of 292 atmospheres at 410° C. and a final pressure of 270 atmospheres and a pressure of 73 atmospheres after cooling, there are obtained, in addition to 51 gms. of water, 218 gms. of a greenish oil which has a specific gravity of 0.858 and of which 15.5 per cent dissolve in a 14 per cent alkali solution. The oil contains 8.3 per cent of unsaturated compounds and on distillation gives a distillate of 62.2 per cent up to 150° C. and of 89.2 per cent up to 200° C. It darkens considerably after a short time.

2. 300 gms. of a brown coal producer tar-oil (specific gravity 0.944, sulfur content 1.88 per cent; 16 per cent soluble in 14 per cent alkali solution) are heated with hydrogen at 450° C. for one hour together with 3 gms.—i. e. 1 per cent—of sulfur and 6 gms.—i. e. 2 per cent—of molybdic acid. The initial pressure is 125 atmospheres, the maximum pressure 274 atmospheres at 400° C., the final pressure 246 atmospheres and the pressure after cooling 66 atmospheres. There are obtained 18 gms. of water and 217 gms. of a water clear oil having a specific gravity of 0.813. It contains no constituent that is soluble in caustic soda solution. On distillation, 79 per cent passes over up to 200° C.

3. An Hungarian brown coal crude tar (from Berente) with a sulfur content of 2.78 per cent gives, under the above described experimental conditions in the presence of 1 per cent of sulfur, 2 per cent of molybdic acid and 0.5 per cent of boric acid, a 78.8 per cent yield of an oil rich in paraffin.

If, under otherwise similar conditions, there is employed as catalyst 2 per cent of molybdic acid and 0.5 per cent of boric acid (without the addition of sulfur), a yield of only 63.0 per cent of a pale yellow oil is obtained.

4. An Hungarian brown coal crude tar with a sulfur content of 2.92 per cent is hydrogenated at 440° C. for one hour, as above described, with 2 per cent of molybdic acid and 0.5 per cent of boric acid. There is obtained a water clear product having a specific gravity of 0.793, no constituent soluble in alkali solution, and having a content of 45 per cent of aromatic hydrocarbons. On distillation, 63.2 per cent pass over up to 150° C. and 84.7 per cent up to 200° C.

5. If crude tar of example 4 is treated with hydrogen at 400° C. for an hour in the presence of 2 per cent of molybdic acid and 0.6 per cent of boric acid, there is obtained as final product a white mass with a content of 8.5 per cent of paraffin which can be isolated directly by being pressed off. 15.5 per cent of this product boils up to 150° C. and 31.3 per cent boils up to 200° C.

6. A dark brown crude paraffin (sulfur content 1.5 per cent) is hydrogenated at 420° C. for one hour with 2 per cent of molybdic acid and 0.5 per cent of boric acid. There is obtained in this case, in addition to a small quantity of oil and water, a pure white crystalline paraffin in a very good yield (93 per cent).

7. A brown coal producer tar gas oil (specific gravity 0.966, sulfur content 1.57, 44 per cent soluble in alkali solution) is treated with hydrogen for one hour at 440° C. together with 2 per cent of molybdic acid and 0.5 per cent of boric acid. There is obtained a water clear oil which has a specific gravity of 0.787, contains no constituent soluble in alkali solution, and has a content of 0.4 per cent of unsaturated compounds and 25 per cent of aromatic hydrocarbons. 75.3 per cent boils up to 150° C. and 86.8 per cent up to 200° C.

The term "hydrogen" employed in the claims is to be understood as covering not only hydrogen as such but also gases containing hydrogen in any desired quantity and gases which are capable of producing hydrogen under the reaction conditions.

What I claim is:—

The method of destructive hydrogenation of carbonaceous substances, which consists of subjecting the substances to temperatures of from 250° C. to 700° C. and pressures of from 100 to 500 atmospheres, and treating the substances with hydrogen in the presence of molybdenum catalyst and hydrogen sulphide, so that hydrogen sulphide is continuously present in optimal amounts between the limits of from 1% to 6% by weight of the carbonaceous substance, so that the action of the molybdenum catalyst is improved over the action of molybdenum catalysts including molybdenum sulphides when used alone, there being continuously present a quantity of hydrogen in minimum amount twice as much as the quantity necessary for the destructive hydrogenation.

In testimony whereof I affix my signature.

JOSEF VARGA.